United States Patent [19]

Cooke

[11] 3,978,249

[45] Aug. 31, 1976

[54] METHOD FOR PRODUCING INTRICATE METAL DESIGNS ON GLASS

[75] Inventor: William C. Cooke, Kingsport, Tenn.

[73] Assignee: ASG Industries, Inc., Kingsport, Tenn.

[22] Filed: Apr. 29, 1974

[21] Appl. No.: 464,965

[52] U.S. Cl.................................... 427/99; 427/96; 427/102; 427/269; 427/259
[51] Int. Cl.²........................................... B44D 1/18
[58] Field of Search................ 117/212, 105.2, 213, 117/54, 124 C; 427/96, 99, 88, 102, 269, 287, 272; 174/68.5; 338/258

[56] References Cited
UNITED STATES PATENTS

| | | | |
|---|---|---|---|
| 2,559,969 | 7/1951 | Kennedy | 427/259 |
| 3,249,467 | 5/1966 | Stookey | 117/212 |
| 3,617,373 | 5/1968 | Mott | 427/99 |

Primary Examiner—John D. Welsh
Attorney, Agent, or Firm—Pennie & Edmonds

[57] ABSTRACT

A method is disclosed for producing intricate metal designs bonded to glass such as required in electrical resistance heating circuits, microwave oven panel shields and the like. The method includes the application to a sheet of glass of the negative of the desired design by silk screening or other screening techniques utilizing a screenable pasting agent which screens through the negative pattern and adheres temporarily to the glass. The entire sheet of glass is then coated with the desired metal, usually aluminum, according to known metallizing techniques in which flame-atomized metal is applied to the heated glass sheet and thus bonds thereto. The metallized surface is then brushed with wire rotary brushes which remove the metal from those areas where the screenable pasting agent has been applied. After washing, further wet brushing, rinsing and drying, the positive desired design in metal remains securely bonded to the glass.

10 Claims, 2 Drawing Figures

METHOD FOR PRODUCING INTRICATE METAL DESIGNS ON GLASS

BACKGROUND OF THE INVENTION

In those applications where an intricate design of metal bonded to glass is desired such as on electrical resistance heating plates, microwave oven door panel shields, and the like, the procedure has generally involved application to the glass sheet of a thin coating of aluminum or other metal by known metallizing techniques. An enamel resist was then applied to the coating by silk screening and then the aluminum removed in those areas not protected by the enamel resist by use of caustic or acid etching baths. Subsequent neutralizing and washing are then used to neutralize the chemicals of the etching bath. The product thus produced may, if desired, be further totally coated with a high temperature lacquer or the like to render the exposed glass areas opaque and to protect the intricate metal design from the atmosphere.

It will be appreciated that while this method has proved successful, it does involve costly and intricate steps utilizing caustic and acid etching baths, neutralizing baths and the like. It also requires the use of costly silicone enamel resistant paint and frequently results in pinholes in the aluminum pattern by the etching action of the baths when the silicone resist is not perfectly applied, this system also presents difficulties with respect to control of the accuracy of the grid line width.

SUMMARY OF THE INVENTION

The present method overcomes the limitations and considerable expense of previous methods by applying to the glass the negative of the desired pattern utilizing a screenable pasting agent, preferably a talc or kaolin base mixed with water and sodium silicate, the entire glass sheet with the negative pattern thereon is then coated with the desired metal by conventional metallizing techniques. Subsequent brushing with a wire brush removes the metal areas where the paste has been applied and with subsequent washing, wet brushing, rinsing and drying, the positive metal pattern is left securely bonded to the glass. It will be appreciated that this method eliminates the costly and intricate steps of caustic acid etching baths, neutralizing baths, expensive sodium silicate resistant paint, pinholes and the like. It has been found that the grid line width can be more accurately controlled utilizing this new system and the variation in pattern from one plate to another in production is considerably less, thus permitting closer tolerances and a higher selection of an acceptable product.

BRIEF DESCRIPTION OF THE DRAWINGS

As shown in FIG. 1, the electrical resistance heating panel comprises a glass sheet 10 of tempered glass having an overlying grid pattern 12 of metal (preferably aluminum) bonded thereto. The grid pattern 12 includes terminal areas 14 and 16 for the receipt of lead wires, not shown, from a source of current. The terminals 14 and 16 may be of several kinds including a terminal (not shown) incorporating in the terminal areas 14 and 16 an overlying bronze layer which then is overlayed with solder. As shown, however, the terminals 14 and 16 have openings 18 and 20 therein through which is exposed at 22 and 24 a spot of silver previously applied to the glass sheet 10.

Figure 1:
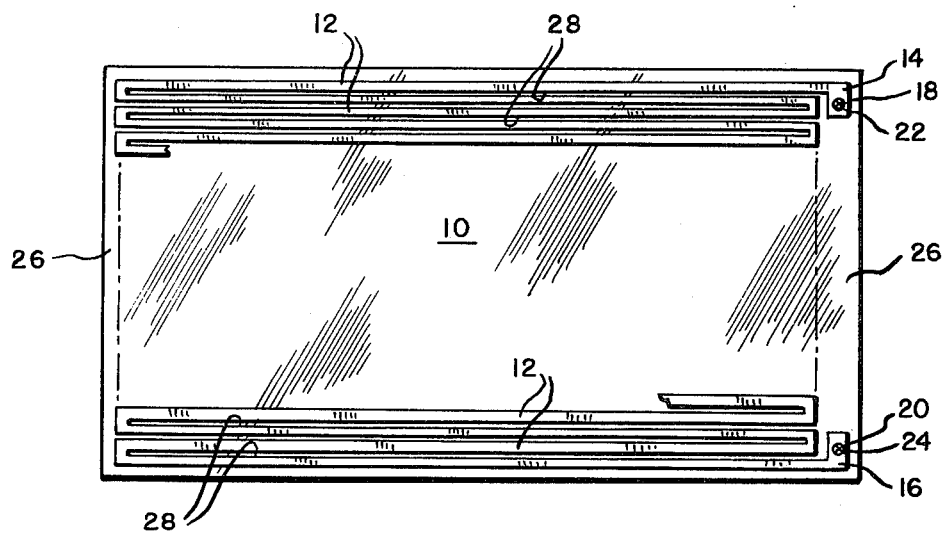
FIG. 1 shows an electrical resistant heating panel produced by the method of this invention.

The exposed areas of the plate 10 include the border area 26 around the periphery and the areas 28 between the successive grid lines. It will be appreciated that the border 26 on the righthand side of the plate as shown is wider due to the presence of the terminal areas 14 and 16. These exposed glass areas 26 and 28 as well as the exposed silver areas 22 and 24 cover all of the area of the panel except that covered with the metallized aluminum and are, therefor, the negative of the aluminum grid 12 and its terminals 14 and 16.

In producing the panel of FIG. 1, the glass sheet 10 is first provided with a small area of silver at the locations where the terminals 14 and 16 will be in the completed part but of a slightly smaller area. It will be appreciated that for the manufacture of intricate metal designs on glass for other purposes than electrical resistance heating panels such initial spots of silver will not be required. The description herein directed to the heating panel merely describes the production of one possible product by the method of this invention.

When the silver terminal areas are to be provided they are applied and then fired in place during the tempering-heating cycle of the glass sheet. The glass sheet 10 with the silver spots thereon is then silk screened with the negative pattern of the grid 12 utilizing a screenable agent. As used herein the term "screenable pasting agent" refers to any suitable paste which is substantially inert both to glass and to the metal coating to be applied and which also may be readily screened by conventional screening techniques onto the surface of the glass, adhering thereto sufficiently to complete the process but not bonding securely thereto. It will be appreciated that the consistency of the screenable agent will vary with the particular nature of the screen used. While reference is had herein to silk screening, it will be appreciated that other screens such as stainless steel screens can be used and are known.

The currently preferred screenable agent comprises a mixture of talc or kaolin in an amount of 45 grams mixed with 50 grams of water and 5 grams of sodium silicate. The process of this invention involves the application of the screenable agent through the screen to produce the negative of the pattern designed on the glass sheet 10. The above described screenable agent adheres to the glass sufficiently for subsequent processing but may be readily removed as herein described.

After screening, the plate is immediately placed on a conveyor which carries it through a preheating oven in which the skin temperature of the glass reaches approximately 550°F. while the surface of the plate is thus heated, the plate is coated with a coating of metal by the process known as metallizing. Preferably aluminum is used. In this process a wire of aluminum is atomized by an oxygen/propane flame and the atomized aluminum deposited upon the heated surface of the tempered glass. The range of temperature of the glass surface is from about 550° to 730°F. It will be appreciated that tempered glass is best used to avoid breaking during this metallizing. In those areas where the glass is not protected by the screenable pasteing agent, the aluminum becomes securely bonded to the glass by a bond believed to be in part mechanical and in part chemical.

Those areas of the plate which have had applied thereto the screenable agent become covered with aluminum in whole or in part but it cannot bond to the glass due to the presence of the agent.

After providing the metallized aluminum coating, the aluminum overlying the negative of the desired pattern and the screenable agent are removed by passing the plate beneath a rotary wire brush which removes the screenable agent and the aluminum thereabove. This dry brushing action removes all of the aluminum that is not bonded to the glass surface itself. If the pattern includes openings such as openings 18 and 20 overlying the silver areas 22 and 24, the aluminum in these areas will be removed as well as the underlying screenable agent. The plate is then thoroughly washed in any suitable light washing solution again brushed with suitable rotary brushes having stiff bristles, but not necessarily wire bristles, rinsed and then dried. The washing and wet brushing removes any screening pasteing agent residue that may remain after the initial wire brushing.

Depending upon the product being produced subsequent treatments may or may not be required or desired. For example, in home heating elements, food warming trays, and the like, the aluminum electrical circuit 12 may be protected from potential atmospheric deterioration by the application of temperature resistant lacquers.

It has been found when utilizing this method for the production of electrical resistance heating plates that the spaces 28 between grid lines can be made as narrow as 1/32 inch, although, generally the circuit design will call for spaces 3/32 inch and wider.

Figure 2:
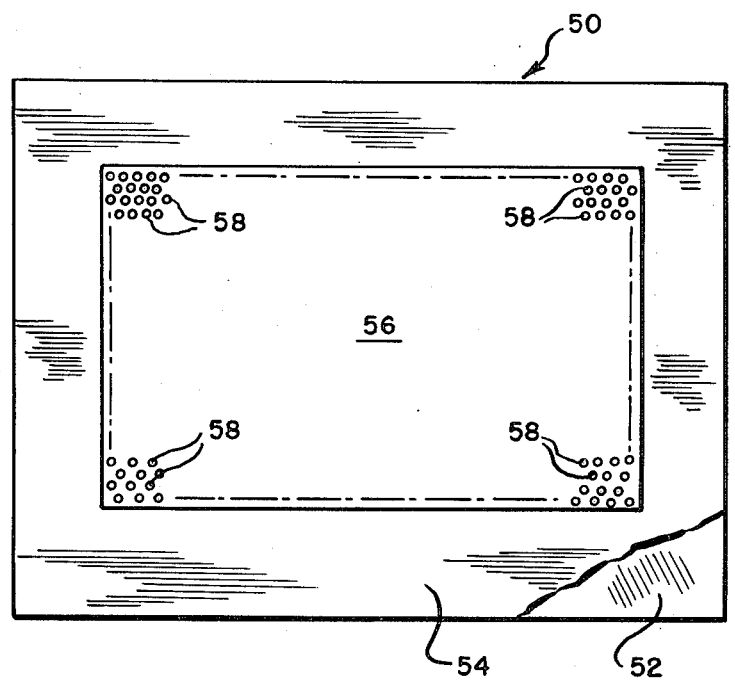
FIG. 2 shows a microwave oven door panel and shield produced in accordance with this invention.

FIG. 2 shows a microwave oven door panel, generally indicated at 50 comprising a tempered glass sheet 52 and a metallized coating 54 thereover. Within the central area 56 of the metal coating 54 are a plurality of small holes 58 which provide a window area extending throughout the central area 56 of the panel. In such door panels, the metallized coating 58 is used to prevent excessive leakage of microwave radiation from within the oven outwardly. Yet, in order to be able to see foods within the oven being cooked, some provision must be made for a window. Accordingly, small apertures 58 are provided through the metallized coating 54. These apertures are quite small with their size in part depending upon the thickness of the coating 54. In one preferred embodiment the holes 58 are circular and 0.035 inch in diameter with 11,375 holes extending over the area 56. It will be appreciated that this produces a large number of very small openings. If conventional etching systems are to be used the problem of covering the entire metal coating 54 with enamel resist, except for the openings 58 which are disconnected is difficult. Etching techniques for accomplishing this are known but require additional steps. By utilizing the method described above the glass sheet 52 may first be screened with a screenable agent in a pattern that is the negative of the coating 54. In this instance, the screenable agent would be screened through the screen onto the areas 58. The panel would then be coated with metallized aluminum, the aluminum overlaying the areas 58 and the screenable agent removed by wire brushing and then washed, brushed, rinsed and dried as described above. Accordingly, when disconnected areas such as the openings 58 are to be provided in the metal coating, this method is particularly useful.

While the metal coatings involved in all of these applications may vary widely, a typical coating for an electrical heater plate is 2 to 3 mils. Although, it may vary from 1 to 3 mils or more depending upon the width of the grid lines, the designed resistance of the plate and other like factors. The particular thickness of these metal coatings is not critical to the presently disclosed method.

I claim:

1. The method of producing designs of metal on glass comprising, applying a screenable pasting agent comprising a mixture of talc or kaolin and sodium silicate in water to one surface of a sheet of glass through a screen to produce the negative of the desired design, heating said sheet of glass, metallizing said one surface of said glass sheet including the portions thereof covered with said pasting agent to form a coating of metal thereon, and brushing the one surface of said glass sheet to remove the applied pasting agent and the portion of said metal coating overlying said pasting agent to provide the positive of the desired design in metal securely bonded to said surface of said glass sheet.

2. The method of claim 1 in which the removal of said pasting agent and the overlying metal is accomplished by brushing with a rotary wire brush.

3. The method of claim 2 in which, subsequent to said brushing said sheet is washed, again brushed, rinsed and dried.

4. The method of claim 3 in which said second brushing utilizes brushes with softer bristles than said first brushing.

5. The method of claim 2 in which the metal is applied to said heated glass sheet by atomizing the metal in a flame.

6. The method of claim 5 in which said metal is aluminum.

7. The method of claim 1 in which said pasting agent comprises a mixture of about 45 parts by weight of talc or kaolin and 5 parts by weight of sodium silicate in 50 parts by weight of water.

8. The method of claim 7 in which the removal of said pasting agent and the overlying metal is accomplished by brushing with a rotary wire brush.

9. The method of claim 1 in which the coating of metal is from 1 to 3 mils in thickness.

10. A method of producing designs of metal on glass comprising, applying a screenable pasting agent comprising a mixture of talc or kaolin and sodium silicate in water to one surface of a sheet of glass through a screen to produce the negative of the desired design, heating said glass sheet, metallizing said one surface of said glass sheet including the portion thereof covered with said pasting agent in amounts to form a metal coating of at least 1 mil in thickness and brushing said one surface of said glass sheet to remove the applied pasting agent and the portion of said metal coating overlying said pasting agent to provide the positive of the desired design in metal securely bonded to said surface of said glass sheet.

* * * * *

UNITED STATES PATENT AND TRADEMARK OFFICE
CERTIFICATE OF CORRECTION

PATENT NO. : 3,978,249
DATED : August 31, 1976
INVENTOR(S) : William C. Cooke

It is certified that error appears in the above-identified patent and that said Letters Patent are hereby corrected as shown below:

Column 2, lines 31, 32, 39, 44, 48, 50, 66, "screenable agent" should be --screenable pasting agent--

Column 3, lines 2, 7, 9, 14-15, 19, 58, 59-60, 63 "screenable agent" should be --screenable pasting agent--

Column 3, line 4 " the agent" should be --the pasting agent--

Signed and Sealed this

Seventh Day of December 1976

[SEAL]

Attest:

RUTH C. MASON
*Attesting Officer*

C. MARSHALL DANN
*Commissioner of Patents and Trademarks*